United States Patent [19]

Worth et al.

[11] Patent Number: 4,535,954

[45] Date of Patent: Aug. 20, 1985

[54] FISHING REEL WITH DELAYED ACTION BRAKE

[75] Inventors: Charles C. Worth, Kentfield; John N. Young, Fairfax, both of Calif.

[73] Assignee: Charles C. Worth Corporation, Kentfield, Calif.

[21] Appl. No.: 617,103

[22] Filed: Jun. 4, 1984

[51] Int. Cl.$^3$ ............................................. A01K 89/02
[52] U.S. Cl. ............................................. 242/84.52 B
[58] Field of Search .................. 242/84.52 R, 84.52 B; 310/93, 105

[56] References Cited

U.S. PATENT DOCUMENTS 2,550,861  5/1951  Ransom ......................... 242/84.52 B

FOREIGN PATENT DOCUMENTS 153048  1/1956  Sweden ......................... 242/84.52 B

OTHER PUBLICATIONS 58-113,366, Japanese Printed Application, Aug. 3, 1983.

Primary Examiner—Billy S. Taylor
Attorney, Agent, or Firm—Melvin R. Stidham

[57] ABSTRACT

In a rotating spool casting reel a permanent magnet carried on the housing and a fan blade rotor with metallic disc attracted by the magnet and fan blades rotatable with the shaft but slidable thereon. The fan blades tend to pull the rotor away from the magnet and spring means biases it toward the magnet whereby magnetic attraction is maximum at low speeds and minimum at high speeds.

4 Claims, 1 Drawing Figure

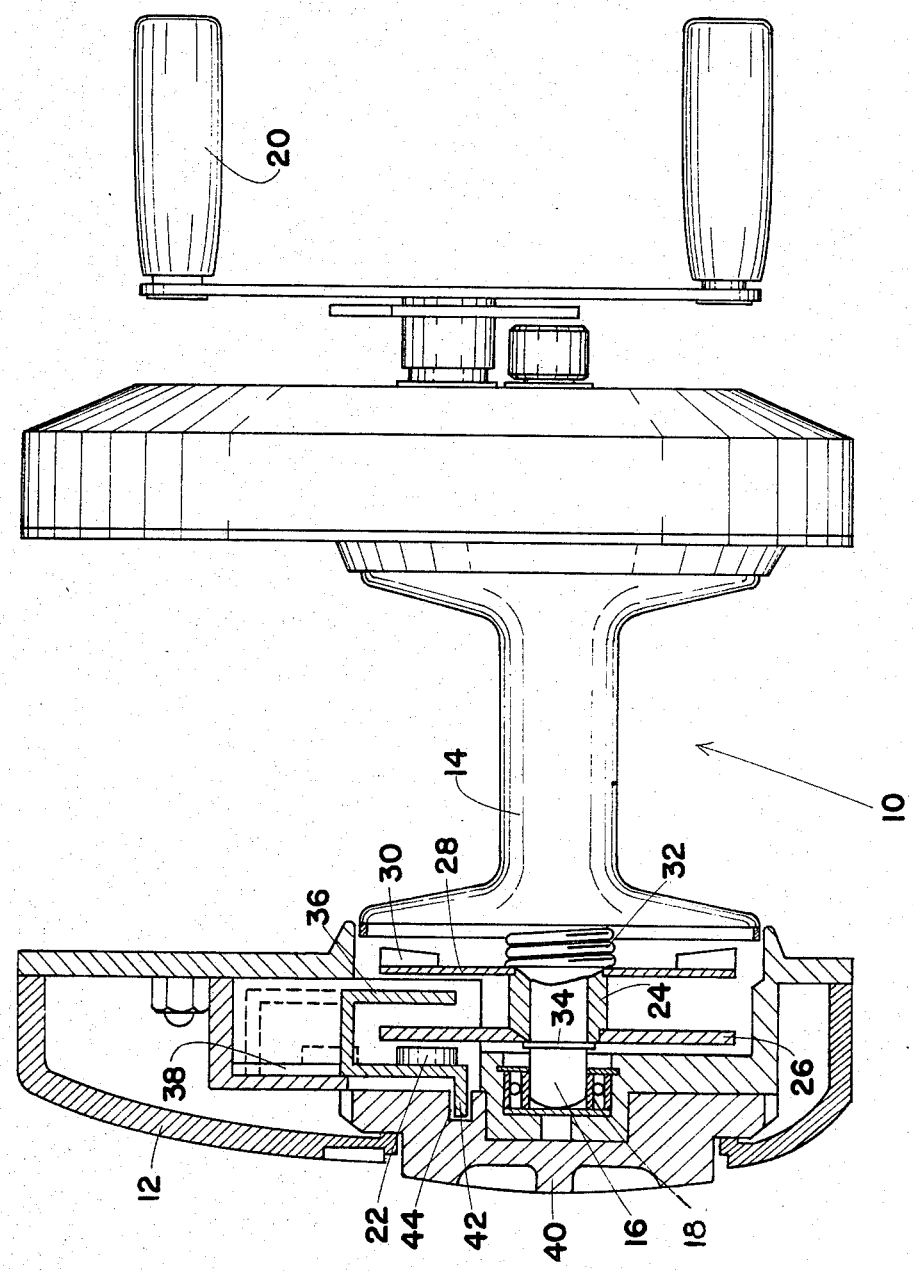

FISHING REEL WITH DELAYED ACTION BRAKE

BACKGROUND OF THE INVENTION

Casting reels of the rotating-spool type have spools that rotate freely in order to increase the range over which the fisherman can cast his line. However, a problem is generated in that the momentum of the rotating spool frequently produces surface velocities greater than the velocity of the line itself going out, commonly producing a backlash that could result in severe line entanglement. More experienced fisherman are able to alleviate this problem somewhat by braking the reel with their thumbs or fingers. However, this requires considerable experience and skill and the method is unreliable, at best. Various mechanical and magnetic braking systems have been proposed, but they also tend to retard rotation at the beginning of the cast when free rotation is most desirable to maximize the length of the cast.

OBJECTS OF THE INVENTION

It is an object of this invention to provide a rotating-spool casting reel that rotates freely initially for maximum casting distance and subsequently applies a braking action to prevent backlash.

It is a further object of this invention to provide a rotating-spool casting reel with means to apply a progressively increasing braking action.

Other objects and advantages of this invention will become apparent from the description to follow, particularly when read in conjunction with the accompanying drawing.

SUMMARY OF THE INVENTION

In carrying out this invention, we provide a magnet on the housing. A rotor that is rotatable with, but slidable on, the spool shaft includes both a metallic disc and a fan blade. The rotation of the metallic disc is retarded by the magnet, and the fan blade is configurated to pull the disc axially away from the magnet to reduce the amount of retardation at high rotary velocities. A spring biases the rotor axially toward the magnet for greater magnetic attraction to the disc. Hence, during the initial part of the cast when the spool is rotating at a high rate, the fan moves away from the magnet to minimize braking action produced thereby, and as the spool and fan decelerate, the spring starts to overcome the action of the fan and biases it closer to the magnet for progressively increasing braking action.

DESCRIPTION OF THE DRAWING

The drawing is a top view, partially in section, of a rotating-spool casting reel embodying features of this invention.

DESCRIPTION OF A PREFERRED EMBODIMENT

Referring now to the drawing with greater particularity, the rotating-spool reel 10 of this invention includes a suitable frame or housing 12 on which is rotatably carried a spool 14 for conventional fishing line (not shown). The spool 14 is carried on a shaft 16 to rotate therewith, the shaft being carried in suitable low-friction bearings 18, such as the ball bearings shown mounted in the housing 12. As in conventional structures, the spool 14 is adapted to be rotated manually by handle 20, but may be released for free rotation for purposes of casting.

Carried on the housing 12 is a permanent magnet 22, and slidably carried on the shaft 16, but rotatable therewith is a fan rotor 24 including a metallic disc 26 and a fan blade disc 28 with fan blades 30 formed thereon. A coil spring 32 biases the fan rotor 24 against a stop collar 34 on the shaft 16 and the fan blades 30 are configurated to oppose the spring 32 during casting rotation. That is, when the spool 14 is rotating at high speed during the initial part of the cast as it is pulled by the line with weights (not shown) the fan is able to overcome the spring 32 to pull the fan rotor 24 and metallic disc 26 farther away from the magnet 22 to minimize its braking action. Gradually, however, as the spool 14 and fan blades 28 slow in rotation, the spring 32 takes over and pushes the fan rotor 24 back toward the stop collar 34, where braking action is at its maximum. Hence, during the initial part of the cast, when free rotation of the spool 14 is desirable, the magnet 22 exerts little braking action. However, the braking action gradually increases as the rotation of the spool 14 slows and the magnet takes over to stop the disc 28 and, with it, the shaft 16 and spool 14.

Preferably, the magnet 22 is carried on a slide 36 that is slidably carried in a radial slideway 38 in the housing 12 for movement between an innermost position shown wherein braking action is at a maximum, and an outer position, shown in phantom wherein braking action is reduced. This sliding movement may be achieved by turning a knob 40, with a follower 42 on the slide being carried in a spiral groove 44 in the inner surface of the knob 40 to move in or out with rotation of the knob.

While this invention has been described in conjunction with a preferred embodiment thereof, it is obvious that modification and changes therein may be made by those skilled in the art to which it pertains without departing from the spirit and scope of this invention, as defined by the claims appended hereto.

What is claimed as invention is:

1. In a rotating spool casting reel comprising:
   a frame;
   a shaft rotatable on said frame; and
   a spool fixed on said shaft to rotate therewith;
   the improvement comprising:
   a magnet carried on said frame;
   a metallic rotor rotatable with said shaft but slidable thereon toward and away from said magnet;
   spring means biasing said rotor toward said magnet; and
   air deflector means carried on said rotor and disposed so that air impinging thereon, during rotation of said rotor when casting, imposes an axial force vector against said rotor in opposition to said spring means.

2. The combination defined by claim 1 including:
   a metallic disc carried on said rotor adjacent said magnet;
   said air deflector means comprising fan blades carried on said rotor and conditioned to pull said rotor away from said magnet in response to rotation thereof during casting.

3. The combination defined by claim 1 wherein:
   said magnet is radially slidable on the frame relative to said rotor to vary the magnetic affect thereon.

4. In a rotating spool casting reel including:
   a frame;
   a shaft rotatable on said frame, and a spool fixed on said shaft to rotate therewith; the improvement comprising:

a rotor rotatable with said shaft but axially slidable thereon;

a stop member on said shaft to limit axial movement of said rotor in one direction;

yieldable means biasing said rotor in said one direction;

a brake member carried on said frame and cooperative with said rotor to retard rotation thereof;

the braking force of said brake member being reduced as said rotor is moved axially away from said stop member; and fan blades carried on said rotor and conditioned to pull said rotor away from said stop member in response to rotation of said shaft while casting.

* * * * *